United States Patent [19]

Aprahamian

[11] 4,231,473
[45] Nov. 4, 1980

[54] DUAL PURPOSE INSERT FOR TAPE CARTRIDGES AND CASSETTES

[75] Inventor: Vaughn Aprahamian, Rego Park, N.Y.

[73] Assignee: Le-Bo Products Co., Inc., Maspeth, N.Y.

[21] Appl. No.: 22,145

[22] Filed: Mar. 20, 1979

[51] Int. Cl.³ .......................................... B65D 85/672
[52] U.S. Cl. ..................................... 206/387; 190/51; 211/40
[58] Field of Search .......................... 206/387; 190/51; 211/40

[56] References Cited

U.S. PATENT DOCUMENTS

| | | | |
|---|---|---|---|
| 3,710,900 | 1/1973 | Fink | 206/387 |
| 3,756,383 | 8/1973 | Krylar | 206/387 |
| 3,907,116 | 9/1975 | Wolf et al. | 206/387 |
| 4,003,463 | 1/1977 | Berkman | 206/387 |

*Primary Examiner*—Joseph Man-Fu Moy
*Attorney, Agent, or Firm*—Philip H. Gottfried

[57] ABSTRACT

An insert for a carrying case is adapted to receive and selectively store boxed tape cassettes and 8-track tape cartridges in one or more longitudinal troughs. Each trough includes side walls spaced to accommodate the width of an 8-track cartridge, a bottom wall, and a plurality of partitions projecting inwardly from the side walls toward one another, longitudinally spaced to accommodate the thickness of 8-track cartridges, forming a plurality of storage compartments adapted to receive 8-track cartridges. An arrayed plurality of pairs of shelves, each adapted to receive and store one boxed cassette, includes substantially congruent shelves recessed within each of the side walls located above the topmost extensions of the partitions. The longitudinal spacing between the side edges of each shelf accommodates the thickness of a boxed cassette, and the distance between the rear walls of each pair of shelves accommodates the width of a boxed cassette. The longitudinal pitch between at least one longitudinally adjacent pair of shelves is smaller than the median longitudinal pitch of the partitions so that the total number of pairs of shelves for storing boxed cassettes within each trough exceeds the total number of storage compartments for 8-track cartridges, so that the insert can receive and store a larger number of boxed cassettes than 8-track cartridges.

13 Claims, 10 Drawing Figures

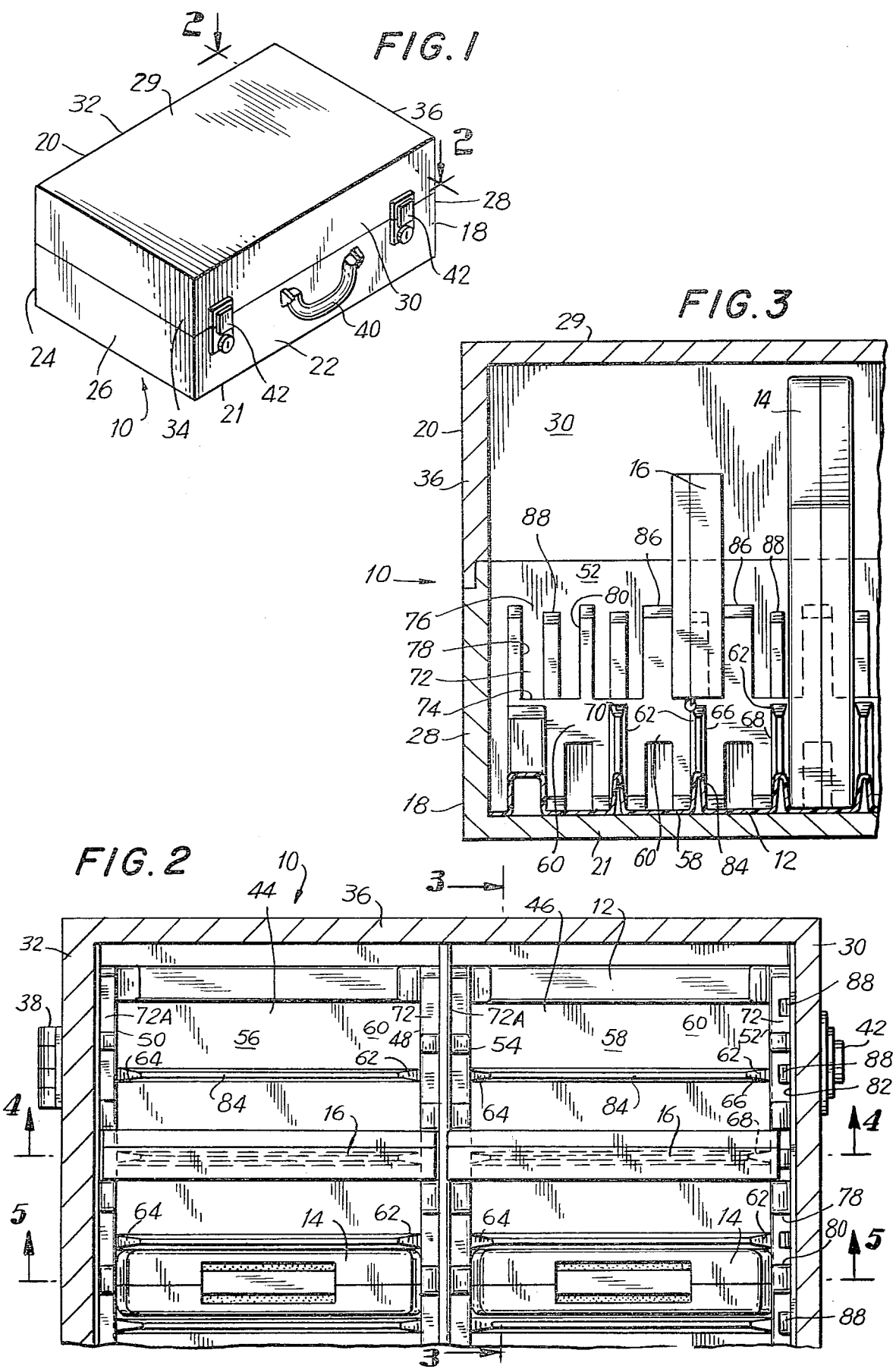

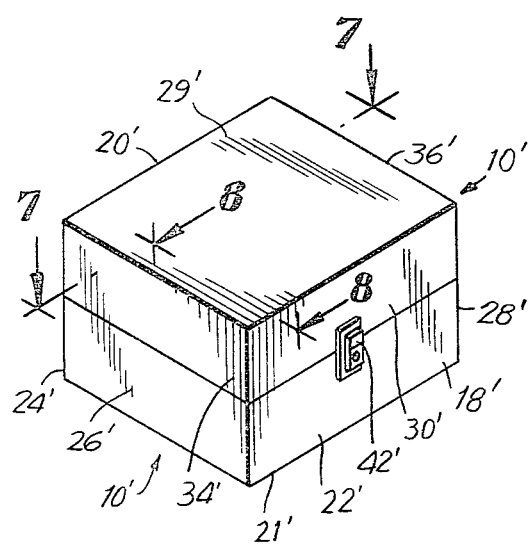
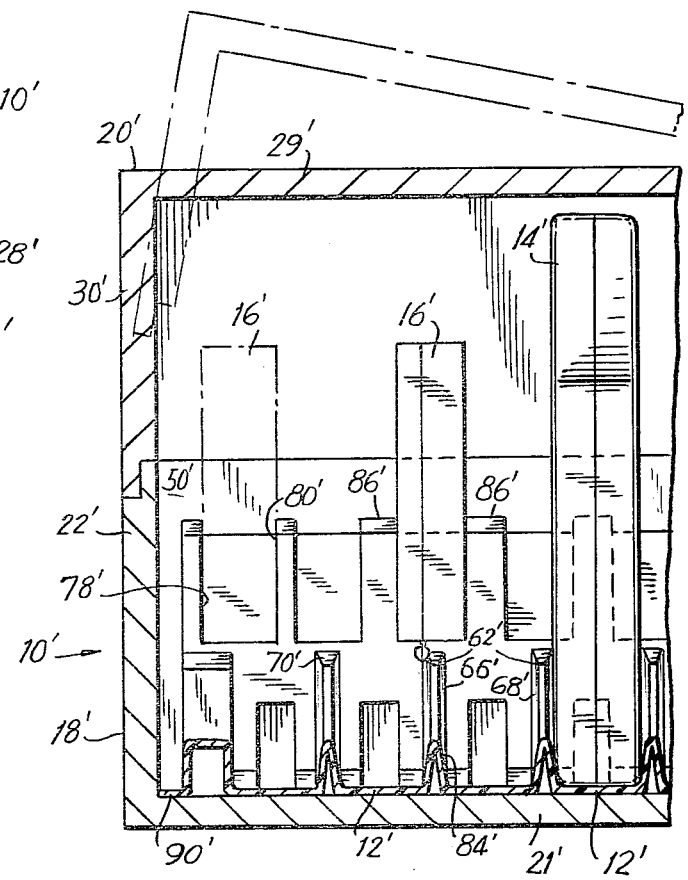
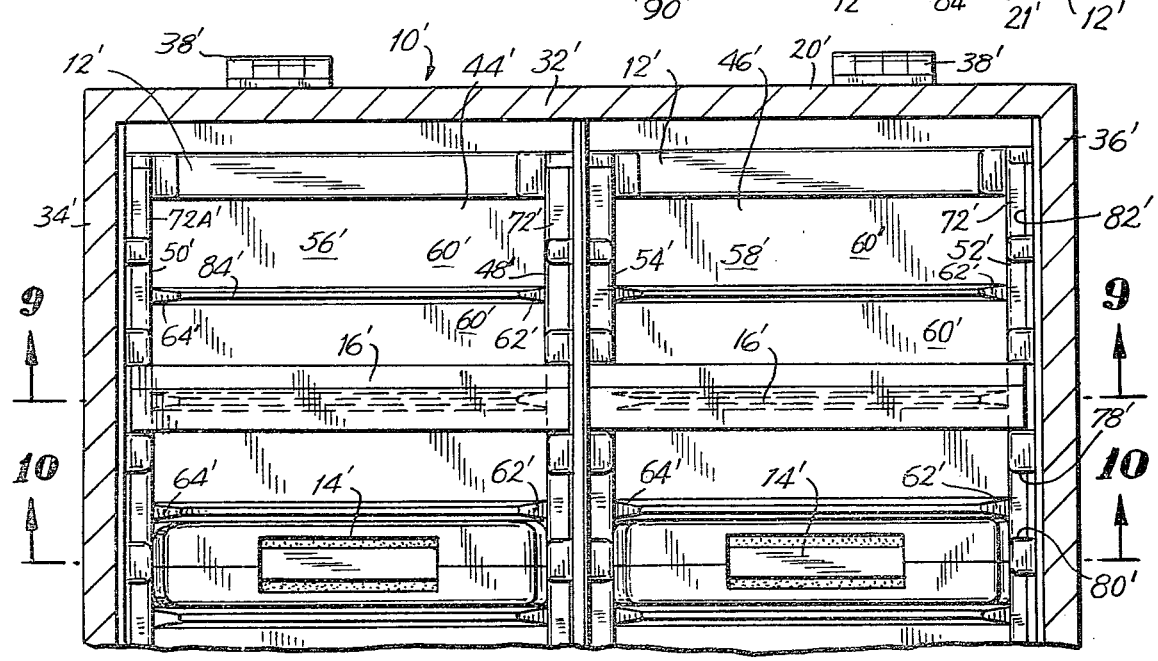

DUAL PURPOSE INSERT FOR TAPE CARTRIDGES AND CASSETTES

The present invention relates generally to devices for storing and carrying tape cassettes and cartridges and, in particular, to an insert for carrying cases which selectively receives and stores 8-track tape cartridges and/or boxed tape cassettes.

In recent years, cartridges and cassettes for various types of audio and video tapes have become extremely popular. Specifically, at least two different types of tape devices for audio reproduction have become extremely popular: cassettes (which are generally kept in the plastic boxes in which they are sold), and 8-track tape cartridges (which usually are sold in paper boxes which are generally discarded). While cassettes and 8-track cartridges are technologically similar, they nonetheless are now generally made and sold in two relatively uniform sizes and shapes. While both have a generally rectangular polyhedral shape, 8-track cartridges tend to be substanially thicker and taller than boxed tape cassettes while nonetheless being narrower in width than boxed cassettes.

In today's mobile society, it has become desirable and popular to be able to readily transport tape cassettes and cartridges from one place to another, especially since the advent of tape players in automobiles. Since tape cassettes and cartridges are somewhat expensive and somewhat susceptible to damage from the elements, it has become necessary to develop cases for storing and carrying these devices. Thus, numerous and sundry carrying cases have been developed to carry either boxed cassettes or 8-track cartridges, but not both.

An inherent problem of this development has been the fact that carrying cases are naturally large and cumbersome and take up a large degree of storage and sales space as compared to their relative commercial value. A dealer wishing to accommodate customers who use cassettes as well as customers who use cartridges would ordinarily have to carry an inventory of two different types of carrying cases.

Various solutions to this problem have been proposed, such as the apparatus disclosed in U.S. Pat. No. 4,003,468, which issued Jan. 18, 1977. Devices such as that disclosed in the aforementioned patent provide a fixed number of areas, each of which can accommodate either a boxed cassette or an 8-track cartridge. Each of these areas is designed to accommodate the largest dimensions of both types of magnetic tape enclosures.

A problem which has hitherto not been solved is that carrying cases as just discussed have severe limitations with respect to the relative numbers of cassettes and cartridges which they can accommodate.

It is therefore an object of the present invention to provide an improved carrying case for selectively receiving and storing boxed tape cassettes and 8-track cartridges which is capable of storing more boxed cassettes than cartridges.

It is a further object of the present invention to provide such a carrying case which stores such cassettes and cartridges safely and securely.

It is yet another object of the present invention to provide such a carrying case which is inexpensive and simple to produce.

In an illustrative embodiment demonstrating certain aspects of the present invention, an insert is adapted to be received within a carrying case and to itself selectively receive and store a plurality of first and second types of generally rectangular polyhedral objects in at least one arrayed row. The first type of polyhedral object has a relatively large thickness and a relatively small width as compared to the second type of polyhedral object.

The insert includes at least one longitudinally extending trough. Each of these troughs includes first and second parallel, vertically extending side walls, each having an upper edge. The distance between confronting surfaces of the first and second side walls is substantially equal to or slightly greater than the width of the first type of polyhedral object and slightly smaller than the width of the second type of polyhedral object. A bottom wall is affixed to the first and second side walls.

A plurality of storage compartments, each adapted to receive and store one of the first type of polyhedral object, includes a first longitudinally arrayed plurality of parallel, upstanding partitions projecting inwardly from the first side wall, and a second longitudinally arrayed plurality of parallel upstanding partitions projecting inwardly from the second side wall. Each of the partitions has a topmost extension. The first plurality of partitions projects toward and is substantialy transversely coplanar with corresponding ones of the second plurality of partitions. The longitudinal spacing between confronting faces of longitudinally adjacent ones of the partitions is substantially equal to or slightly greater than the thickness of the first type of polyhedral object.

A longitudinally arrayed plurality of pairs of shelves, each of said pairs of shelves being adapted to receive and store one of the second type of polyhedral objects, includes a first longitudinally arrayed plurality of shelves recessed within the first side wall with the lowermost part of said shelves being located to be above the topmost extensions of the first plurality of partitions. A second longitudinally arrayed plurality of shelves is recessed within the second side wall with the lowermost part of said shelves being located to be above the topmost extensions of the second plurality of partitions. Each one of the second plurality of shelves is transversely aligned with and confronting one of the first plurality of shelves and together form one of the pairs of shelves.

Each of the shelves has a bottom surface, an open top, first and second side edges and a rear wall. The distance between the side edges of each of the shelves is substantially equal to the thickness of the second type of polyhedral object. The distance between the respective rear walls of each of the pairs of shelves is substantially equal to or slightly greater than the width of the second type of polyhedral object. The longitudinal distance between corresponding side edges of at least one longitudinally adjacent pair of the shelves is smaller than the median longitudinal distance between corresponding points of longitudinally adjacent pairs of the partitions. The total number of corresponding pairs of shelves within each of the troughs thereby exceeds the total number of first polyhedral object storage compartments, and the insert can receive and store a larger number of polyhedral objects of the second type than of the first type.

The above description, as well as further objects, features and advantages of the present invention, will be more fully understood by reference to the following detailed description of the presently preferred but nonetheless illustrative embodiment, in accordance with the present invention, when taken in conjunction with the accompanying drawing, wherein:

FIG. 1 is a perspective view, on a reduced scale, of a carrying case in which has been inserted one preferred embodiment of the insert of the present invention, with the side walls of the insert parallel to the front and rear walls of the carrying case;

FIG. 2 is a fragmentary sectional top plan view taken substantially along the line 2—2 of FIG. 1, and looking in the direction of the arrows;

FIG. 3 is a fragmentary sectional rear elevational view taken substantially along the line 3—3 of FIG. 2, and looking in the direction of the arrows;

FIG. 6 is a perspective view of a carrying case in which has been inserted a second preferred embodiment of an insert of the present invention, with the side walls of the insert parallel to the side walls of the carrying case;

FIG. 7 is an enlarged fragmentary sectional top plan view taken substantially along the line 2—2 of FIG. 6, and looking in the direction of the arrows;

FIG. 8 is an enlarged fragmentary sectional right side elevational view taken substantially along the line 8—8 of FIG. 6, and looking in the direction of the arrows, wherein the top cover of the carrying case in the closed position is shown in full lines and wherein the top cover in a partially open position is shown in phantom;

Figure 4:
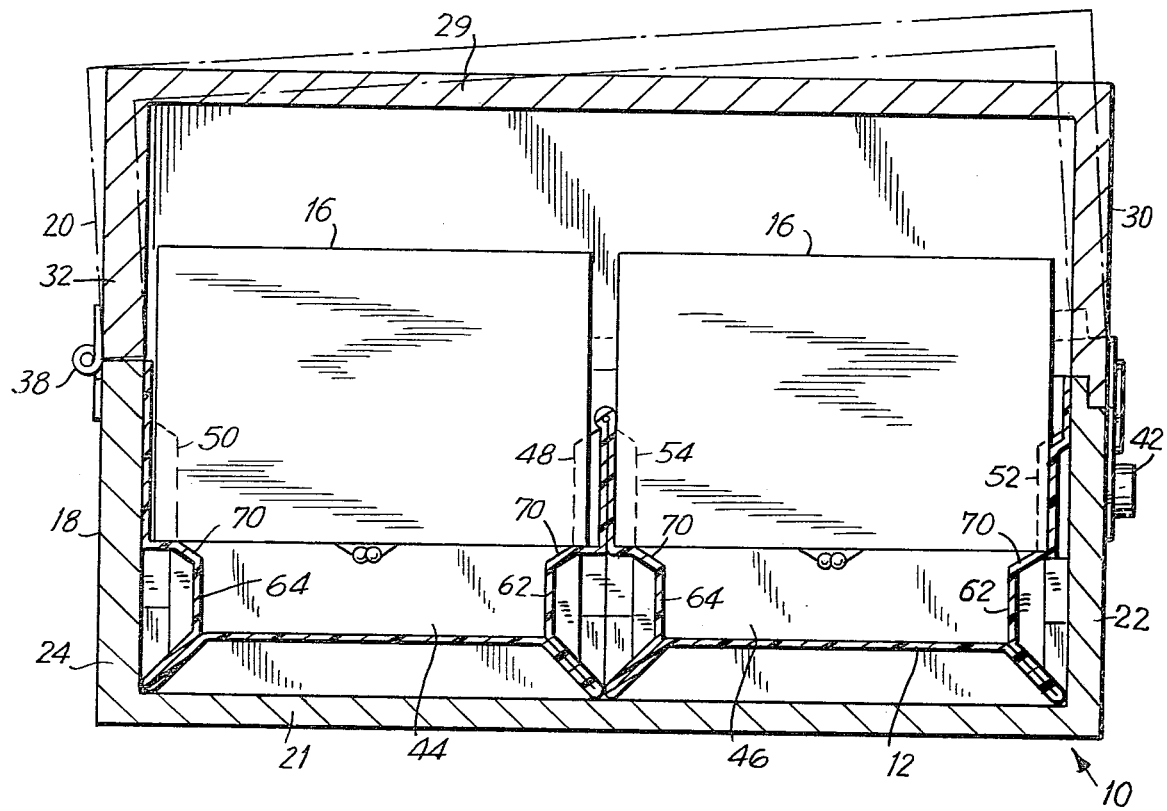
FIG. 4 is a side sectional elevational view through a pair of the second type of polyhedral objects, taken substantially along the line 4—4 of FIG. 3 and looking in the direction of the arrows, wherein the top cover of the carrying case in the closed position is shown in full lines, and wherein the top cover in a partially open position is shown in phantom.

Referring now specifically to the drawing and first to the embodiment shown in FIGS. 1 through 5, there is shown an illustrative carrying case having an insert embodying features of the present invention, with the carrying case generally designated by the reference numeral 10, and the insert generally designated by the reference numeral 12. As will be described herein, the carrying case 10 is adapted to receive an insert 12 of the present invention which is itself adapted to selectively receive and store a plurality of first and second types of generally rectangular polyhedral objects such as 8-track cartridges 14 and boxed cassettes 16 respectively. While the present description generally refers to such polyhedral obejcts as cartridges and cassettes for purposes of convenience, it will be understood that the present invention can be used with any two types of generally rectangular polyhedral objects, wherein the first type of polyhedral object has a relatively large thickness and relatively small width, such as an 8-track cartridge 14, as compared with the second type of polyhedral object, which has a relatively small thickness and a relatively large width, such as a boxed cassette 16.

Referring again to FIG. 1, the carrying case 10 includes receptacle member 18 and a cover member 20. The receptacle member 18 includes bottom wall 21, a longitudinally extending front wall 22, a longitudinally extending rear wall 24, and transversely extending side walls 26 and 28. The cover member 20 of the carrying case 10 includes a top wall 29, a longitudinally extending front wall 30, a longitudinally extending rear wall 32, and transversely extending side walls 34 and 36.

Figure 5:
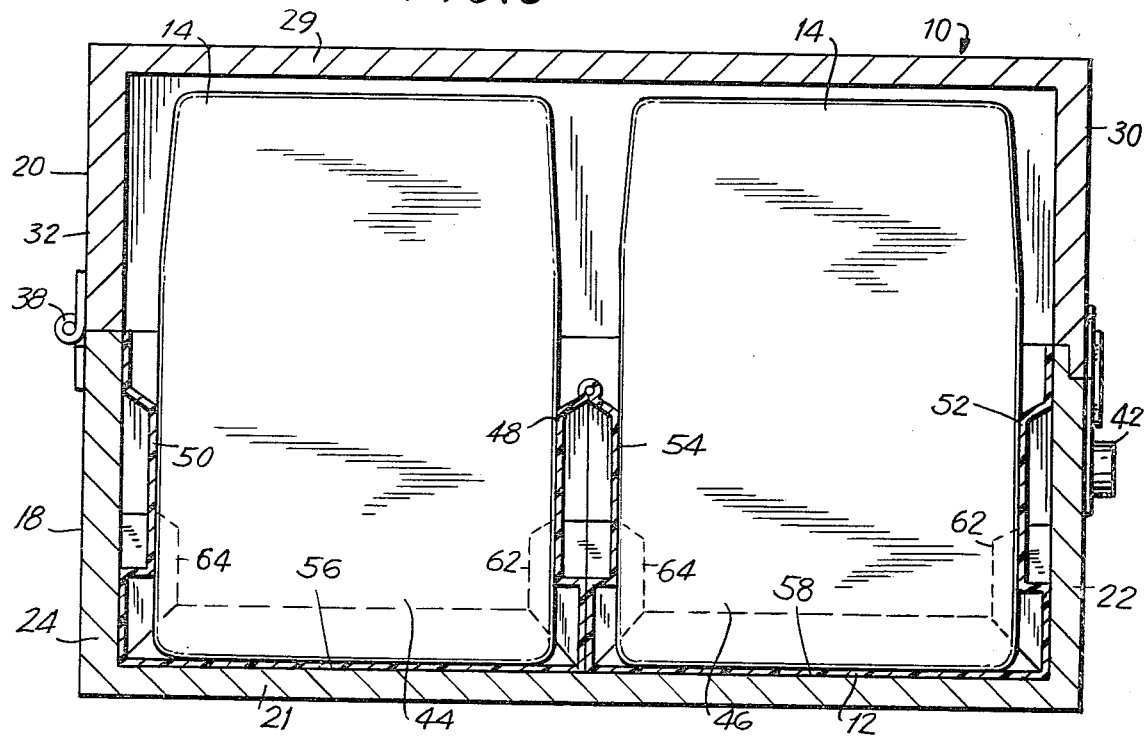
FIG. 5 is a side sectional elevational view through a pair of the first type of polyhedral objects, taken substantially along the line 5—5 in FIG. 3 and looking in the direction of the arrows.
Figure 9:
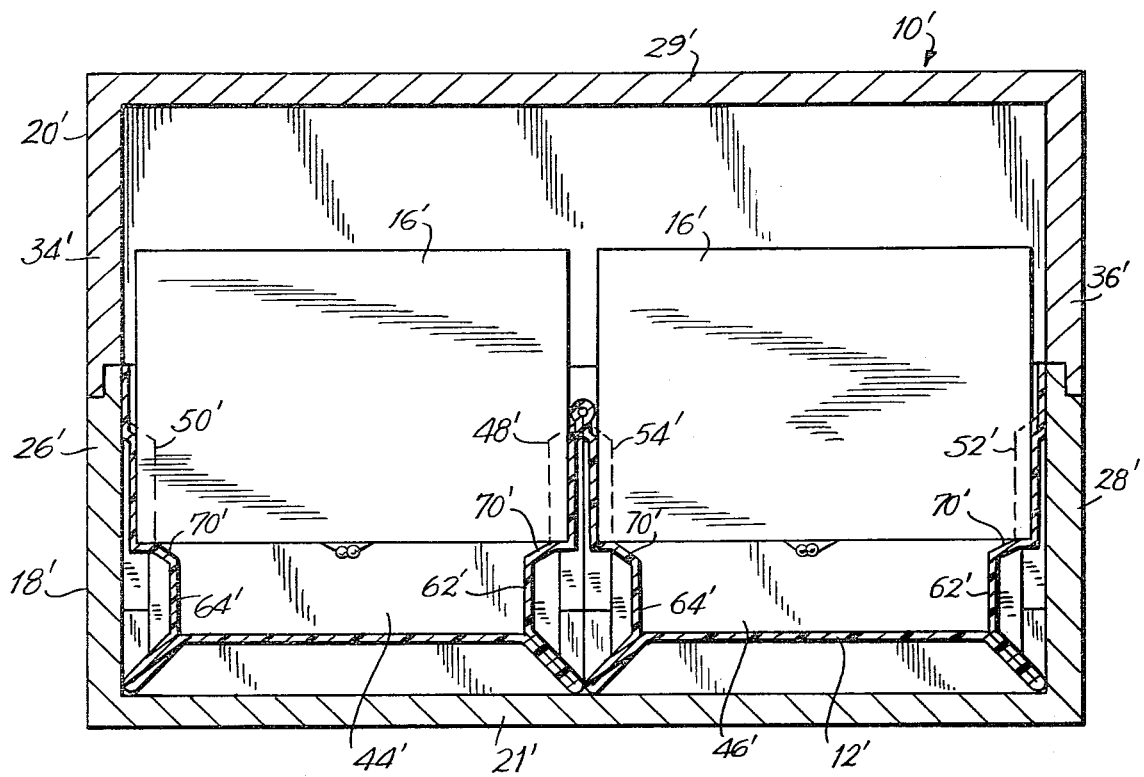
FIG. 9 is a sectional front elevational view through a pair of the second type of polyhedral objects, taken substantially along the line 9—9 of FIG. 7 and looking in the direction of the arrows.
Figure 10:
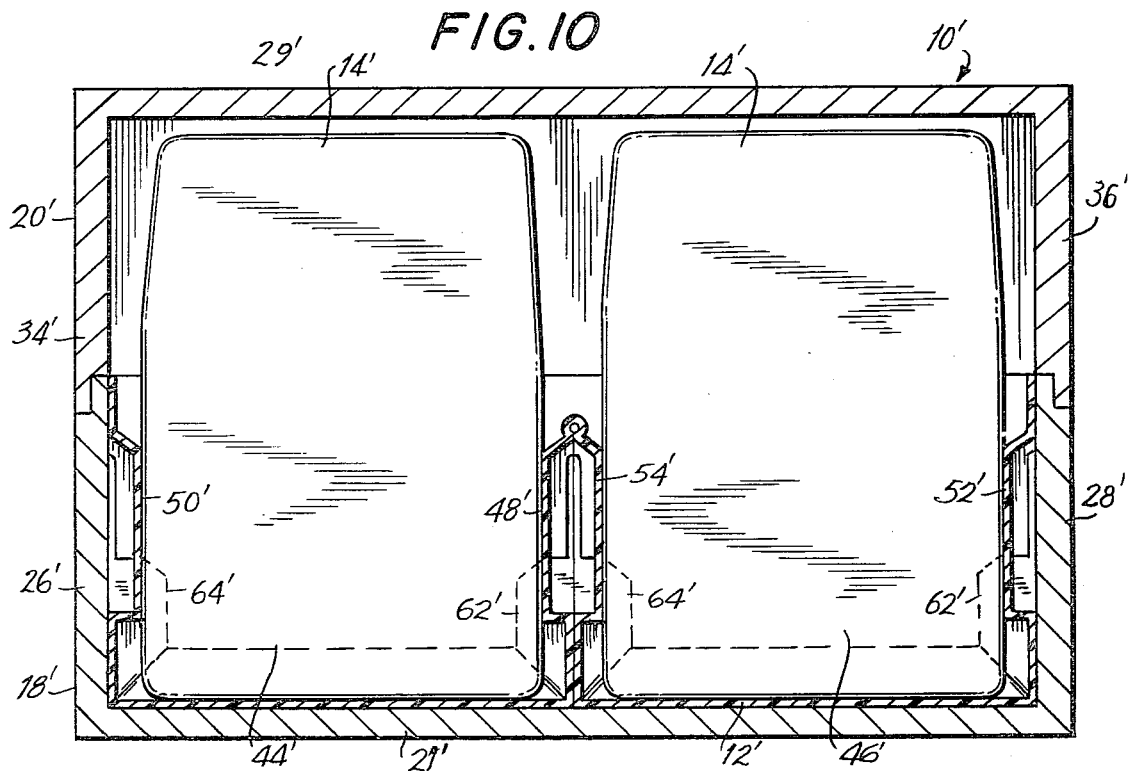
FIG. 10 is a sectional front elevational view through a pair of the first type of polyhedral objects, taken substantially along the line 10—10 of FIG. 7 and looking in the direction of the arrows.

The rear wall 32 of the cover member 20 is hingedly mounted to the rear wall 24 of the receptacle member 18 by conventional hinges 38, as best seen in FIGS. 2, 4 and 5. The carrying case 10 also includes a conventional handle 40 attached to the front wall 22 of the receptacle member 18, as well as conventional locking members 42, 42 for keeping the cover member 20 in a closed position relative to the receptacle member 18.

The insert 12 of the present invention as shown in the presently preferred and illustrative embodiment, is molded from a continuous sheet of plastic material and includes two longitudinally extending troughs 44 and 46 which are transversely arrayed adjacent to one another, as best seen in FIGS. 2 and 4.

Trough 44 includes a first side wall 48 and a second side wall 50, and trough 46 has a first side wall 52 and a second side wall 54 (FIGS. 2 and 5).

The trough 44 also includes a bottom wall 56 joining side walls 48 and 50, and, similarly, the trough 46 has a bottom wall 58 joining side walls 52 and 54, as best seen in FIG. 5.

As illustrated most clearly in FIG. 5, the upper edge of the first side wall 48 of trough 44 is joined to the upper edge of the second side wall 54 of trough 46. It will be appreciated that if more than two troughs are transversely arrayed adjacent to one another, in each case the upper edge of one of the side walls of each trough would be joined to the upper edge of one of the side walls of each adjacent trough.

As can be best seen in FIGS. 2 and 3, each trough 44, 46 has a longitudinal array of storage compartments 60, each of which is adapted to receive and store one 8-track cartridge 14 which, as previously discussed, has a greater thickness but a smaller width than a boxed cassette 16.

To form these compartments 60, the distance between confronting surfaces of the first side wall 48 and the second side wall 50 is made substantially equal to or slightly greater than the width of an 8-track cartridge 14 and, at the same time, slightly smaller than the width of a boxed tape cassette 16, which will be discussed in more detail hereinafter. Similarly, the distance between confronting surfaces of the first and second side walls 52 and 54 respectively is equal to or slightly greater than the width of an 8-track cartridge 14.

As best seen in FIG. 2, the first side wall 48 or 52 of each trough 44 or 46 has a first longitudinally arrayed plurality of parallel upstanding partitions 62 which project inwardly toward the inside of the trough 44 or 46 from the first side wall 48 or 52. Similarly, each trough 44 or 46 includes a second longitudinally arrayed plurality of parallel upstanding partitions 64 projecting inwardly toward the inside of the trough 44 or 46 from the second side wall 50 or 54.

As best seen in FIG. 2, each one of the partitions 62 projecting from one of the first side walls 48 or 52 projects toward and is substantially transversely coplanar with one of the partitions 64 projecting from the second side walls 50 or 54.

As can best be appreciated from FIGS. 2 and 3, each pair of longitudinally adjacent partitions 62 (or 64) has confronting faces 66 and 68, and the longitudinal spacing between the confronting faces 66 and 68 is substantially equal to or slightly greater than the thickness of an 8-track cartridge 14. Accordingly, as seen in FIGS. 2, 3 and 5, each of the compartments 60 is adapted to snugly receive and store one 8-track cartridge 14.

As best viewed in FIGS. 3 and 5, each partition 62 and 64 has a topmost extension 70 which preferably does not extend the full height of the side wall 48, 50, 52, 54, but instead terminates below the upper edge of the side wall.

The presently preferred and illustrative embodiments also include a plurality of longitudinally arrayed, transversely extending bottom guide walls 84 which are mounted to the bottom wall 58 and project upwardly therefrom, as best seen in FIG. 3. The bottom guide walls 84 project vertically from the bottom wall 58 and are substantially coplanar with the first and second pluralities of partitions 62 and 64 which, in turn, are substantially coplanar with one another. Accordingly, in the preferred embodiment of the present invention, each compartment 60 has two bottom guide walls 84 which assist in securely and snugly retaining an 8-track cartridge 14.

The insert of the present invention is not only capable of storing 8-track cartridges 14, but is also capable of receiving and storing a plurality of boxed cassettes 16. This is accomplished through a longitudinally arrayed plurality of pairs of shelves. As will be explained more fully below, each pair of shelves includes a shelf 72 recessed within the first side wall 48 or 52 of a trough and a corresponding shelf 72A recessed within the second side wall 50 or 54 of the same trough. Each pair of shelves 72, 72A is adapted to receive and store one boxed cassette 16, as can best be viewed in FIG. 4.

As can be seen in FIG. 3, a longitudinally arrayed plurality of substantially congruent 72 is recessed in the first side wall 48, 52 of each trough; while a second longitudinally arrayed plurality of substantially congruent shelves 72A are recessed within the second side wall 50, 54. Each of the shelves 72 is substantially congruent with each other and also is substantially congruent with each of the shelves 72A. As best viewed in FIG. 3, the lowermost part of each of the shelves 72, 72A is located to be just above the topmost extension 70 of the partitions 62, 64. Thus, each one of the second plurality of shelves 72A is transversely aligned with and confronts one of the first plurality of shelves 72 and together they form a pair of shelves.

Each shelf 72, 72A has a bottom surface 74 in a generally horizontal plane, an open top 76, and first and second substantially vertical side edges 78, 80, as well as a rear wall 82. As best appreciated from FIG. 3, each of the bottom surfaces 74 of the shelves 72 are substantially coplanar with each other and with the bottom surfaces 74 of the shelves 72A. Further, the distance between side edges 78 and 80 of each shelf 72, 72A is substantially equal to or slightly greater than the thickness of a boxed cassette 16. As best seen in FIG. 2, the distance between the rear walls 82, 82 of each pair of shelves 72, 72A is substantially equal to or preferably slightly greater than the width of the boxed cassettes 16.

As can now be appreciated in FIG. 4, each boxed cassette 16 can be securely and snugly rested within a pair of shelves 72, 72A and rests on the bottom surface 74 of the shelves 72, 72A. As previously discussed, the distance between confronting faces of the first and second side walls 48 and 50 or 52 and 54 is less than that width of a boxed cassette 16, while the distance between the rear walls 82 of the shelves 72, 72A of each pair is equal to and preferably greater than the width of the boxed cassette 16. Thus, the boxed cassette rests on the two shelves, with the midsection of the cassette 16 suspended in mid air.

As previously discussed, prior carrying cases such as that disclosed in U.S. Pat. No. 4,003,468 have been limited to the extent that each area for storing an 8-track cartridge 14, which would be analogous to the compartment 60 of the present invention, has been able to store but a single boxed cassette 16. In the present invention, as best seen in FIGS. 2 and 3, the array of pairs of shelves 72, 72A are substantially independent of the arrays of partitions 62, 64, and can be spaced to take advantage of the important fact that the thickness of boxed cassettes 16 is substantially smaller than the thickness of an 8-track cartridge 14.

For convenience in describing how the foregoing saving of space is achieved, the section of first side wall 52 between each adjacent pair of shelves 72 will be referred to as wall element 86.

In the presently preferred embodiments of the present invention, the longitudinal distance between corresponding points of each longitudinally adjacent pair of partitions 62, 64 (i.e., the "pitch") within each trough is substantially uniform. While there may be some deviations from this uniformity, it will readily be appreciated that there is a median longitudinal distance or pitch between corresponding points of longitudinally adjacent pairs of partitions 62 or 64.

Inasmuch as the thickness of the boxed cassette 16 is smaller than the thickness of the cartridge 14, it is not necessary that the pitch of the pairs of shelves 72, 72A be as large as the pitch of the partitions 62 or 64. The pitch of the shelves, which corresponds to the longitudinal distance between corresponding side edges 78 or 80, may, in some or all areas of the trough 44 or 46, be smaller than the median longitudinal distance between corresponding points of longitudinally adjacent pairs of partitions 62 or 64. This compression of the pairs of shelves 72, 72A allows for a larger number of pairs of shelves 72, 72A than compartments 60 in any given trough.

For reasons explained below, it is nonetheless advantageous in some instances to allow the "pitch" of the shelves 72, 72A to be substantially equal to the "pitch" of the partitions 62, 64. However, as previously discussed, it is an important object of the present invention to take advantage of the thickness of boxed cassette 16, and this is accomplished by allowing the "pitch" between at least one pair of adjacent shelves 72, 72A to be smaller than the foregoing median longitudinal "pitch" of partitions 62, 64.

As can be seen in FIGS. 2 and 3, this local compression of the pairs of shelves 72, 72A is achieved by making the wall element 86 thinner toward the leftmost end of the trough 46 (as viewed in FIG. 3) and also at the right hand end (not shown) than in the middle section of the trough 46. This allows one more pair of shelves 72, 72A to be built into each trough 46 than there are compartments 60.

As previously alluded to, it is nonetheless desirable in some instances to allow the "pitch" of the shelves 72, 72A to be substantially equal to the "pitch" of the partitions 62, 64 in a large portion of the trough 44 or 46.

When this is done, the shelves 72, 72A can be arranged so that the shelves 72, 72A are staggered whereby at least a portion of a partition 62 or 64 is situated below each one of the shelves 72, 72A, and preferably longitudinally positioned proximate the longitudinal center of the shelf 72 or 72A, as can be seen in FIGS. 2 and 3. In such an arrangement, the means "pitch" of the shelves 72, 72A will nonetheless be less than the median longitudinal "pitch" of partitions 62, 64.

In the presently preferred and illustrative embodiments, in addition to positioning a partition 62 or 64 below and at the longitudinal center of each shelf 72 or 72A, the topmost extension 70 of the partitions 62, 64 is situated substantially adjacent to the bottom surface 74 of the shelf 72, 72A, as can be best observed in FIG. 4. When this is accomplished, the partitions 62, 64 are available to act as additional and reserve support for the boxed cassettes 16 in the event that tolerances of the insert 12 are not properly held and a boxed cassette 16 slips off one of the bottom surfaces 74 of the shelves 72, 72A.

The embodiment illustrated in FIGS. 1 through 5 has, as previously described, an arrangement whereby the insert 12 is received within the receptacle member 18 of the carrying case 10 with the first side wall 12 of trough 46 parallel to and abutting the front wall 22 of the receptacle member 18.

As can be appreciated from FIGS. 3, 4 and 5, the heights of both the boxed cassettes 16 and the cartridges 14 are sufficiently great so that when they are received in the insert 12, the topmost portion of them projects vertically above the topmost extent of the receptacle member 18. It is therefore a potential problem that when the cover member 20 of the carrying case 10 is opened and closed (as illustrated in FIG. 4), the movement of the cover member 20 will be interfered with by a boxed cassette 16 in trough 46 (which is the trough adjacent to the front wall 22 of the receptacle member 18 of the carrying case 10).

To avoid this problem, means are provided to position the boxed cassette 16 away from the first side wall 52 of the trough 46 so that the cover member 20 of the carrying case 10 is provided with clearance with respect to the stored boxed cassette 16 when the cover member is moved between open and closed positions. This is accomplished by providing a spacing member 88 mounted to the rear wall 82 of at least one and preferably all of the shelves 72 recessed within the first side wall 52 of trough 46, and projecting into the shelf 72. This assures that the boxed cassette 16 is positioned as far to the left (as viewed in FIGS. 2 and 4) as is possible to assure that clearance is provided.

FIGS. 6 through 10 illustrate a second preferred embodiment of the present invention, and primed reference numerals are used to denote the same elements as are indicated by unprimed numerals in FIGS. 1 through 5.

As can best be seen in FIGS. 7 and 8, the insert 12' of the present invention is inserted in the carrying case 10' so that when the insert 12' is in place, the side walls 48', 50', 52' and 54' of the troughs 44' and 46' are parallel to the side walls 26', 28' of the receptacle member 18' and are substantially perpendicular to the front wall 22' and rear wall 24' of the receptacle member 18.

Here again, the rear wall 32' of the cover member 20' is hingedly mounted to the rear wall 24' of the receptacle member 18' through conventional hinges 38'. The cover member 20' is thereby adapted to rotate about an axis parallel to the receptacle member rear wall 24' and the cover member rear wall 32' between open and closed positions with respect to the receptacle member 18'.

As best seen in FIG. 8, when a cartridge 14' or a boxed cassette 16' is placed in one of the leftmost positions of the carrying case as viewed in FIG. 8, there is a possibility that the movement of the cover member 20' will be interfered with by said cartridge 14' or boxed cassette 16'.

Accordingly, means are provided for positioning the entire insert 12' with respect to the receptacle member 18' away from the receptacle member front wall 22' and toward the receptacle member rear wall 24'. The front wall 30' of the cover member 20' is thereby provided with clearance with respect to the stored cartridge 14' or cassette 16' when the cover member 20' is moved between open and closed positions, as can be seen in FIG. 8.

This is preferably accomplished whereby the end of the insert 12' which is to be positioned proximate the receptacle portion front wall 22' includes an extension member 90' mounted to that end of the insert 12' and extending longitudinally from it. This will act as a spacer and will position the entire insert 12' away from the receptacle member front wall 22'.

The insert 12 of the present invention is preferably molded from a continuous sheet of plastic material, as can be best appreciated from FIGS. 3, 4 and 5 (or 8, 9 and 10). The partitions 62 and 64, as well as the bottom guide walls 84, can be formed "above" the sheet of plastic, with the shelves 72, 72A pressed "below" the sheet of plastic. Similarly, the spacing member 88 can be formed "above" the rear wall 82 of each shelf 72 or 72A. If the partitions 62, 64 and bottom guide walls are properly bevelled, when the U-shaped trough is then formed, their bevelled ends will abut and help form a fully enclosed compartment 60, as best seen in FIG. 4.

It will also be readily understood that two or more troughs can be formed from the same continuous sheet of plastic, with the topmost part of the first side wall 48 of trough 44 joining the topmost part of second side wall 54 of trough 46.

As will be readily apparent to those skilled in the art, the invention described may be used in other specific forms without departing from its spirit or essential characteristics. The present embodiments are, therefore, considered as illustrative and not restrictive, the scope of the invention being indicated by the claims rather than by the foregoing description, and all changes which come within the meaning and range of equivalence of the claims are therefore intended to be embraced therein.

What is claimed is:

1. An insert adapted to be received within a carrying case and to itself selectively receive and store a plurality of first and second types of generally rectangular polyhedral objects in at least one arrayed row, said first type of polyhedral object having a relatively large thickness and a relatively small width as compared to said second type of polyhedral object, said insert comprising: at least one longitudinally extending trough, each of said troughs including first and second parallel, vertically extending side walls, each having an upper edge, the distance between confronting surfaces of said first and second side walls being substantially equal to or slightly greater than said width of said first type of polyhedral object and slightly smaller than said width of said second type of polyhedral object; a bottom wall affixed to said first and second side walls; a plurality of storage compartments each adapted to receive and store one of said first type of polyhedral object, said storage compartments including a first longitudinally arrayed plurality of parallel, upstanding partitions projecting inwardly from said first side wall, a second longitudinally arrayed plurality of parallel upstanding partitions projecting inwardly from said second side wall, each of said partitions having a topmost extension, said first plurality of partitions projecting toward and being substantially transversely coplanar with corresponding ones of said second plurality of partitions, the longitudinal spacing between confronting faces of longitudinally adjacent ones of said partitions being substantially equal to or slightly greater than said thickness of said first type of polyhedral object; and a longitudinally arrayed plurality of pairs of shelves, each of said pairs of shelves being adapted to receive and store one of said second type of polyhedral objects, said shelves including a first longitudinally arrayed plurality of shelves recessed within said first side wall with the lowermost part of said shelves being located to be above said topmost extensions of said first plurality of partitions; a second longitudinally arrayed plurality of shelves recessed within said second side wall with the lowermost part of said shelves being located to be above said topmost extensions of said second plurality of partitions, each one of said second plurality of shelves being transversely aligned with and confronting one of said first plurality of shelves and together forming one of said pairs of shelves, each of said shelves having a bottom surface, an open top, first and second side edges and a rear wall, the distance between said side edges of each of said shelves being substantially equal to said thickness of said second type of polyhedral object, the distance between said respective rear walls of each of said pairs of shelves being substantially equal to or slightly greater than said width of said second type of polyhedral object, the longitudinal distance between corresponding side edges of at least one longitudinally adjacent pair of said shelves being smaller than the median longitudinal distance between corresponding portions of longitudinally adjacent pairs of said partitions, whereby the total number of corresponding pairs of shelves within each of said troughs exceeds the total number of first polyhedral object storage compartments and whereby said insert can receive and store a larger number of polyhedral objects of said second type than of said first type.

2. An insert according to claim 1 further comprising a plurality of longitudinally arrayed, transversely extending bottom guide walls mounted to said bottom wall and projecting vertically therefrom, said bottom guide walls being substantially coplanar with said first and second pluralities of partitions.

3. An insert according to claim 1 wherein a plurality of said troughs is transversely arrayed adjacent to one another.

4. An insert according to claim 3 wherein said insert is molded from a continuous sheet of plastic material and said upper edge of at least one of said first and second side walls of each of said troughs is joined to the upper edge of the first or second side wall of an adjacent one of said troughs.

5. An insert according to claim 1 wherein at least a portion of one of said partitions is situated below each of said shelves.

6. An insert according to claim 5 wherein the partition situated below at least one of said shelves is longitudinally positioned proximate the longitudinal center of said at least one shelf.

7. An insert according to claim 5 wherein said topmost extensions of said partitions are substantially adjacent to said bottom surfaces of said shelves, whereby said topmost extensions of said partitions are capable of supporting said second type of polyhedral object.

8. An insert according to claim 1 wherein said carrying case includes a receptacle member having a bottom wall and front, rear and first and second side walls attached thereto, and a cover member having a top wall and front, rear and first and second side walls attached thereto, said cover member rear wall being hingedly mounted to said rear wall of said receptacle member whereby said cover member is adapted to rotate about an axis between open and closed positions with respect to said receptacle member, and wherein said insert is constructed and arranged so that when said insert is received within said receptacle member and one of said first or second types of polyhedral object is stored in one of said troughs proximate said receptacle member front wall, the topmost portion of said stored polyhedral object projects vertically above the topmost extent of said receptacle member, and further comprising means for providing clearance for said cover member front wall with respect to said stored polyhedral object when said cover member is moved between open and closed positions.

9. An insert according to claim 8 wherein said receptacle member receives said insert so that said insert side walls are substantially parallel to said receptacle member front and rear walls, and said first side wall of one of said troughs abuts said receptacle member front wall and wherein said clearance means comprises means associated with said first side wall of said one of said troughs for positioning said second type of polyhedral object away from said first side wall of said one of said troughs and toward said second side wall of said one of said troughs.

10. An insert according to claim 9 wherein said positioning means comprises a spacing member mounted to said rear wall of at least one of said shelves recessed within said first side wall of said one of said troughs and projecting into said shelf.

11. An insert according to claim 8 wherein said receptacle member receives said insert so that said insert side walls are substantially perpendicular to said receptacle member front and rear walls and wherein said clearance means comprises means for positioning said insert away from said front wall of said receptacle member.

12. An insert according to claim 11 including a first end adapted to be positioned proximate said receptacle member front wall, wherein said positioning means comprises an extension member mounted to said first end of said insert and extending longitudinally therefrom.

13. An insert accordingly to claim 1 wherein the mean longitudinal distance between corresponding side edges of longitudinally adjacent pairs of said shelves is smaller than the median longitudinal distance between corresponding portions of longitudinally adjacent pairs of said partitions.

* * * * *